Patented May 6, 1947

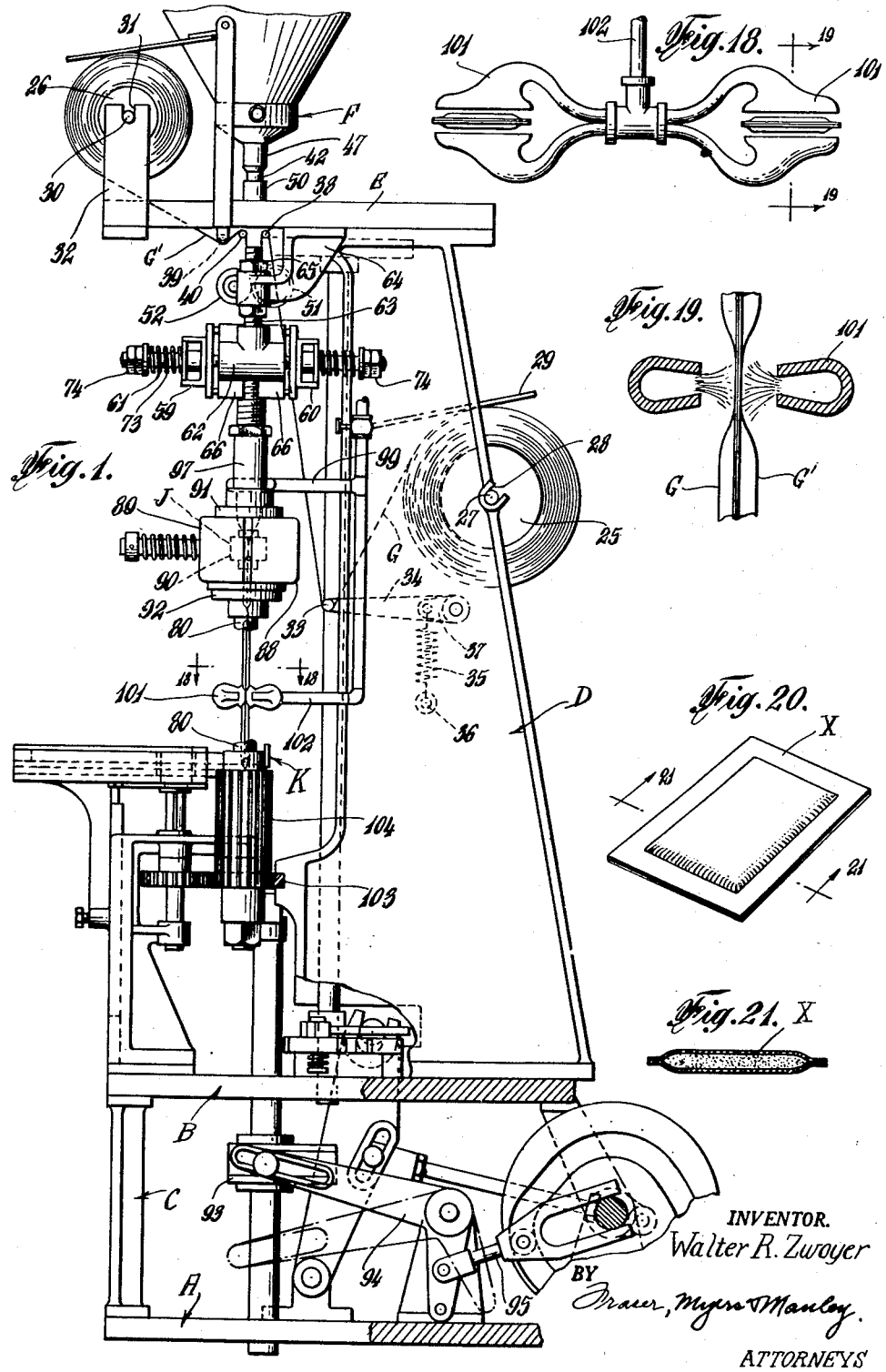

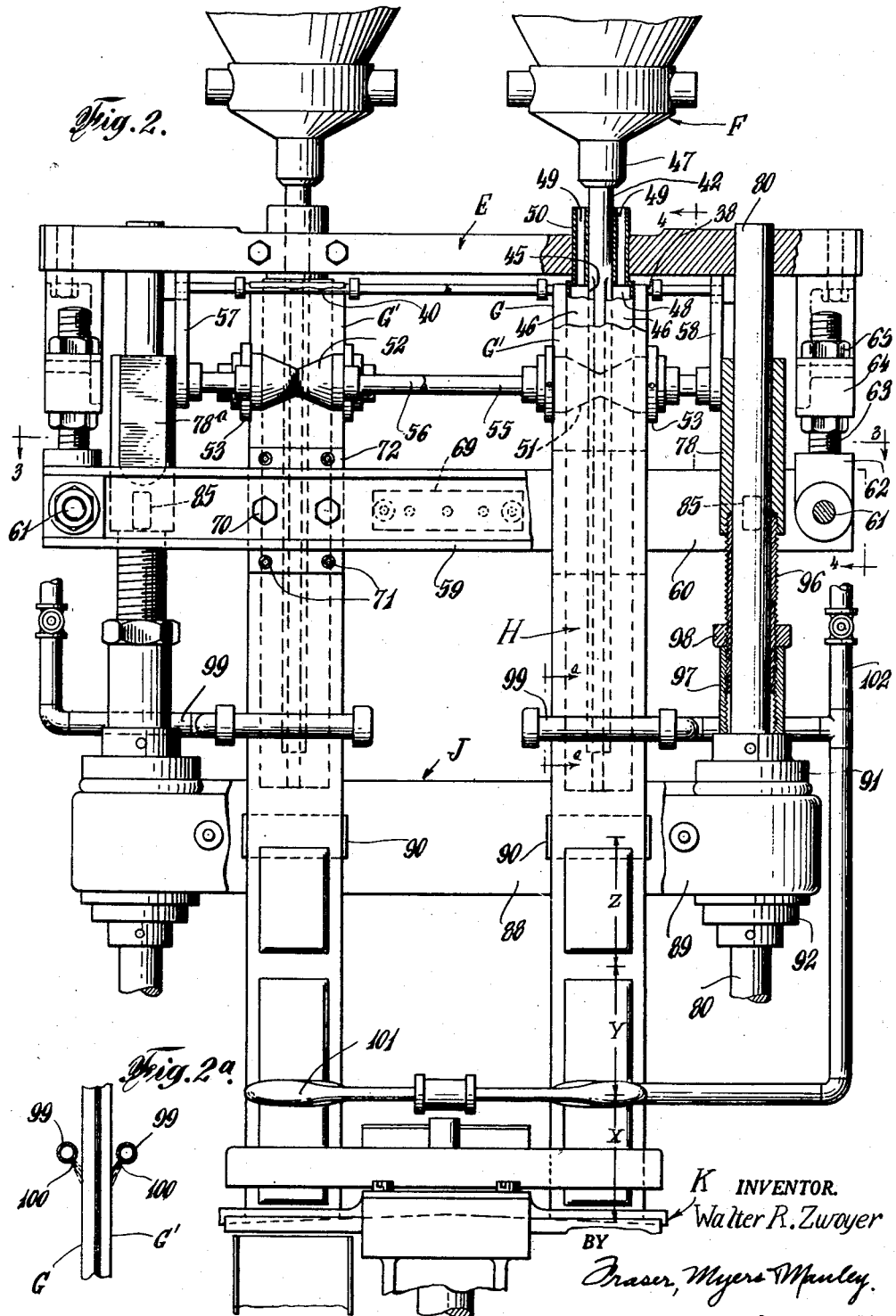

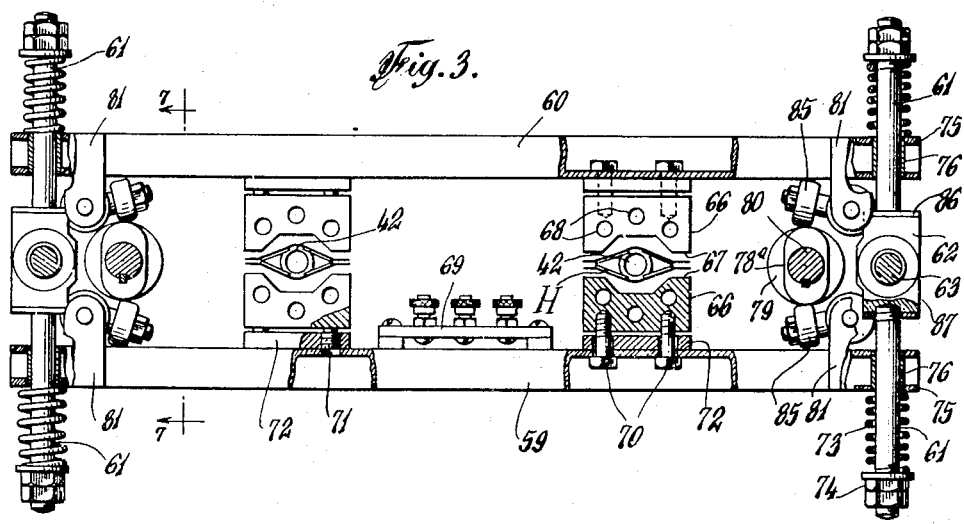
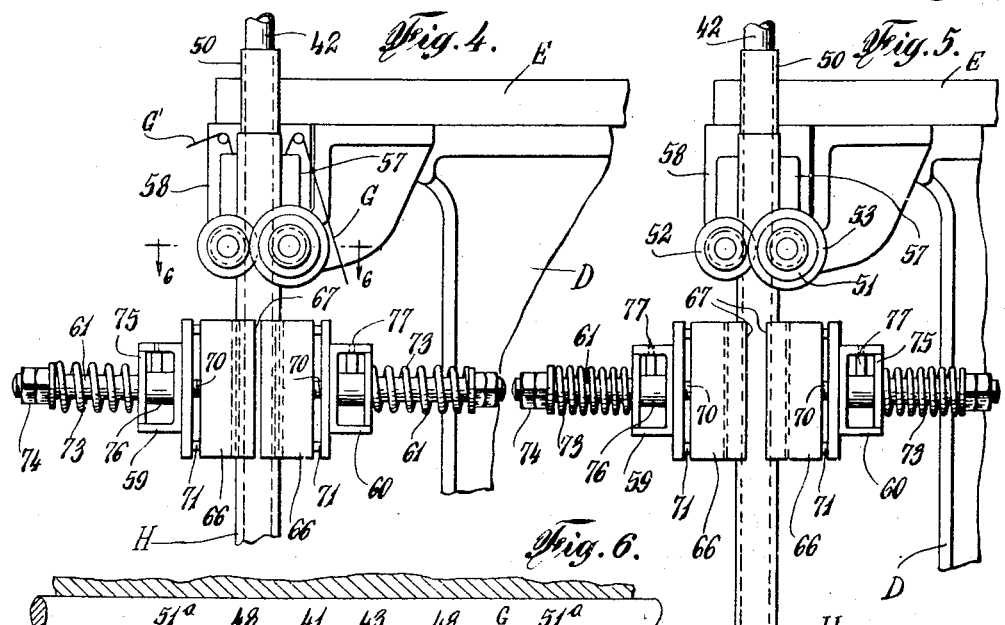
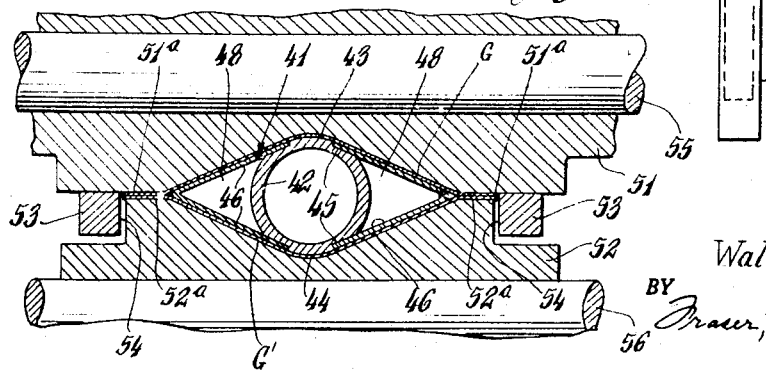

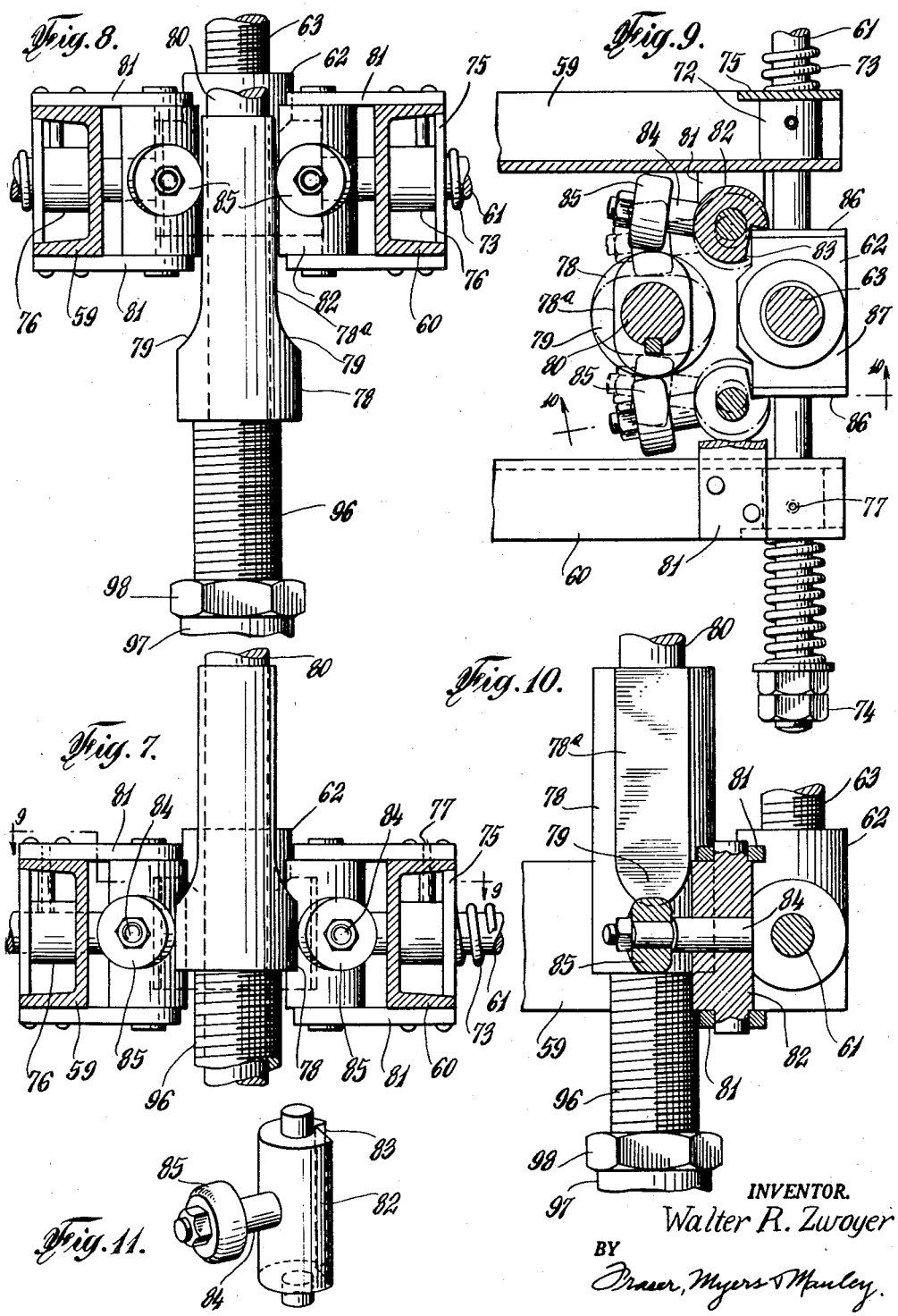

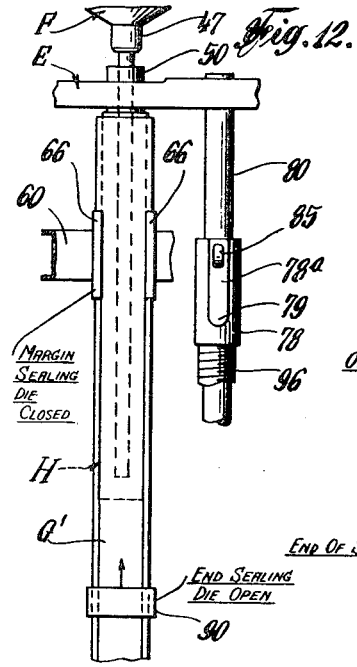
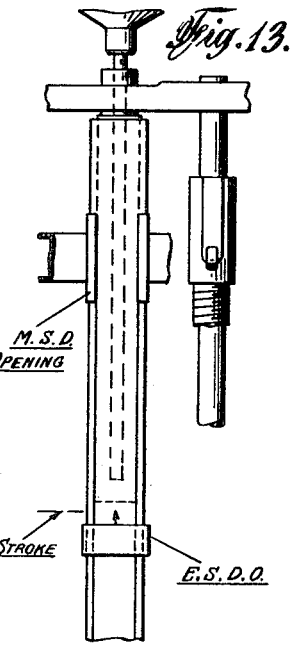
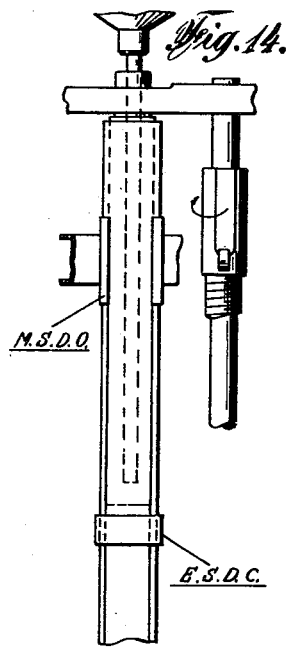
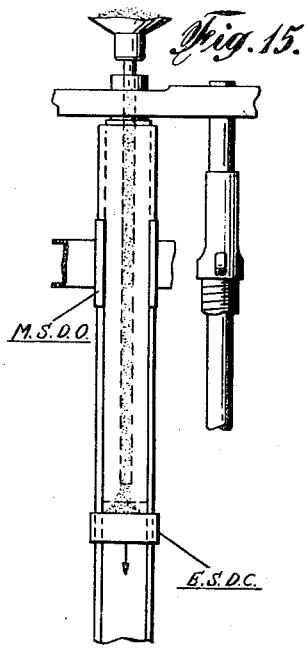
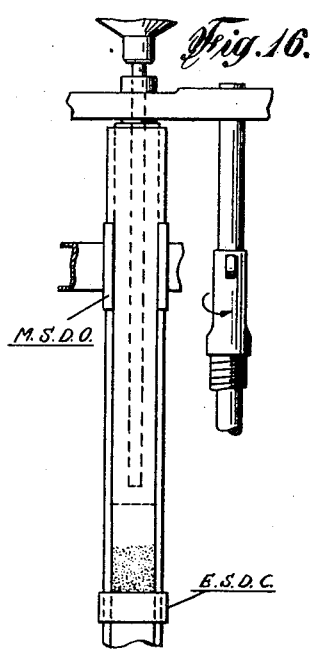
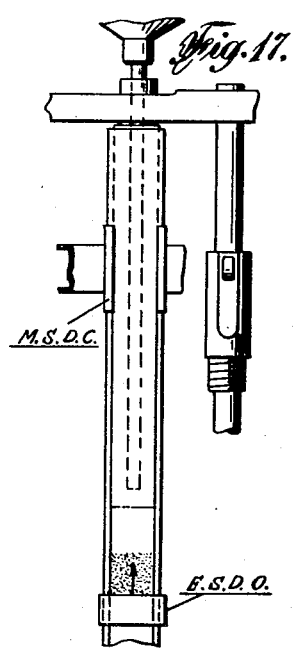

2,419,982

UNITED STATES PATENT OFFICE 2,419,982

AUTOMATIC PACKAGING MACHINE

Walter R. Zwoyer, Maywood, N. J., assignor to Transparent-Wrap Machine Corporation, New York, N. Y., a corporation of New York Application May 13, 1943, Serial No. 486,792

10 Claims. (Cl. 93—3)

1

The present invention relates to an automatic packaging machine, and more particularly to the packaging machine disclosed in my prior United States Patent No. 1,986,422, dated January 1, 1935.

In my aforementioned patent there is disclosed an automatic packaging machine wherein a commodity in the form of small articles such as tablets, pills, capsules and the like, or a quantity of granular or pulverulent material may be fed by gravity, either mechanically or automatically, to packages or containers, a series of which are successively formed by the machine. These containers are formed from a continuous strip of suitable packaging material which is progressively bent around a cylindrical tube former to bring the edges of the packaging material into overlapping engagement, in which relation said edges are sealed to form a tubular portion several times the length of a package. In the operation of the machine the bottom of this tubular portion is sealed, the article to be packed is dropped or fed through the tube former to the bottom of the formed tube, the tube is then pulled downwardly by the end sealing device to advance the strip material over the tube former, the end sealing device is then reciprocated to seal the opposite end of the package while forming the bottom of the next succeeding package, after which the formed connected packages are severed into separate packages. Machines made in accordance with said patent have met with substantial commercial success.

It has been found, however, that with certain kinds of packaging material the bending thereof around the tube former to provide the cylindrical tube gives rise to a creasing of the material, which militates against its moisture-proofness. Also, in the packaging of certain pulverulent materials it was found that during the charging of the material into the package a dust was created which, in rising from the package and having no suitable avenue of escape, tended to coat the interior surfaces of the rearward and advancing tubular portion of the packaging material, which coating at times interfered with the proper sealing of the ends of the package, and particularly so where said ends are heat-sealed.

The present invention seeks to overcome the aforementioned objections. To accomplish this the packages, instead of being formed from a single strip of material, are now formed from opposed layers or ribbons of suitable material which are formed into a flattened tubular portion thus eliminating all danger of creasing the packaging material, means are provided for the escape of displaced air from the package as it is being filled and for carrying off any created dust, and provision is also made for protecting the upper portions of the package before sealing, against the deposition on the inner surface thereof of a film or coating of such dust as would preclude the proper sealing of the package. The invention also includes other features of novelty as will be apparent from the detailed description which follows, when considered in connection with the accompanying drawings, wherein:

Figure 1 is a side elevation of the machine with certain parts thereof being broken away.

Fig. 2 is a fractional front elevation of the machine with certain parts thereof broken away to better show certain details of construction.

Fig. 2a is a section taken substantially along the plane of the line a—a of Fig. 2, showing a detail of the invention.

Fig. 3 is a section taken substantially along the plane of the line 3—3 of Fig. 2.

Fig. 4 is a section taken substantially along the plane of the line 4—4 of Fig. 2 and showing the marginal sealing clamps in closed position.

Fig. 5 is a view similar to Fig. 4 showing the marginal sealing clamps in open position.

Fig. 6 is a section taken substantially along the plane of the line 6—6 of Fig. 4.

Fig. 7 is a section taken substantially along the plane of the line 7—7 of Fig. 3 and showing the marginal sealing clamps in opened position.

Fig. 8 is a view similar to Fig. 7 showing the marginal sealing clamps in closed position.

Fig. 9 is a section taken substantially along the plane of the line 9—9 of Fig. 7.

Fig. 10 is a section taken substantially along the plane of the line 10—10 of Fig. 9.

Fig. 11 is a perspective view of the marginal sealing clamp operating roller shown in Figs. 7 to 10.

Figs. 12 to 17 diagrammatically illustrate various positions of the marginal clamping dies and end sealing dies during the cycle of forming, filling and closing a package.

Fig. 18 is a section taken substantially along the plane of the line 18—18 of Fig. 1.

Fig. 19 is a section taken substantially along the plane of the line 19—19 of Fig. 18.

Fig. 20 is a perspective view of a completed and filled package made in accordance with the present invention.

Fig. 21 is a section taken substantially along the plane of the line 21—21 of Fig. 20.

Referring to the drawings, and for the present more particularly to Figs. 1 and 2 thereof, the machine generally is built upon a framework in which A is a suitable base plate, B is a table mounted upon legs C so as to be spaced apart from the base plate, D, D, are standards constituting side frames which are mounted upon the table B and support a platform E, which, in turn, supports a feed mechanism F and various other parts of the machine. The structural framework thus formed, it will be understood, may be varied at will so long as the operative parts are properly supported.

The machine shown in the drawings is a duplex machine, that is to say, it is designed to simultaneously operate to produce two series of packages. In other words, in the operation of the machine two container tubes are constantly being made, filled, severed and delivered. In this connection it will be understood that the machine may be multiplexed to any degree so that any suitable number of container tubes may be simultaneously produced, filled, severed and delivered, thereby increasing the productive capacity of the machine as desired. As the structure and operative mechanism of the separate means for forming the container tubes, filling, severing and delivering the filled packages are identical, and are simultaneously controlled, the following description will be limited to one such operative mechanism.

Referring first to Figs. 1 to 3 of the drawings, the packaging material for forming the containers is supplied from two reels 25 and 26 suitably mounted with respect to the machine. The reel 25 as shown, is mounted on a spindle 27 which fits in grooves 28 formed on the side frame D. On this reel 25 is wound a long strip or ribbon of packaging material G of a width which is suitable to form one face or one-half of a complete container. The packaging material may be of various kinds, such as regenerated cellulose, laminated paper, waxed paper and the like, any or all of which may have at least one surface, that is, the face intended to provide the inner surface of the package, coated with a coating which will adhere to another similar coating under the application of heat and pressure. Pivoted to rest on the top of the roll of material G is a steadying weight or spring 29 which prevents overrunning of the reel. The reel 26 as shown, is mounted upon a spindle 30 supported in grooves 31 of a pair of standards 32 supported by the platform E. On the reel 26 is wound a long strip or ribbon of packaging material G' similar to G and which is to form the opposite face or second half of a container.

The strip or ribbon of packaging material G is led down over a tension roller 33 mounted on a pair of arms 34, which are given the proper tension by a spring 35, one end of which is attached to a fixed point 36 of the frame and the other end of which is attached to a short lug 37 on a rockshaft which connects the arms 34. The strip G then passes upwardly over an idler roller 38 and thence downwardly to a tube-former H. The strip G' is guided alternately under and over a pair of idler rollers 39 and 40 and thence downwardly to the tube-former H.

The tube-former H consists of an outer tubular structure 41 of substantially oblong and preferably flattened diamond shape in horizontal cross section having a central cylindrical inner tube 42 therein, diametrically opposite portions 43 and 44 of which lie flush with and form part of the outer surface of the tube-former. In other words the tube-former may be said to have flattened arcuate surfaces. To provide this construction, the inner tube 42 has longitudinal grooves 45 formed in its outer surface, into which fit and are secured the ends of V-shaped plates 46. Preferably the lower end of the inner tube 42 has its inner wall portion cut away so that the inner tube proper terminates inwardly of the lower end of the tube-former, as best shown in Fig. 2, for a purpose which will be presently explained. Preferably, also, the upper portion of the inner tube 42 extends beyond the top of the V-shaped plates and is connected with a hopper 47 forming part of a feed mechanism F. For supporting the inner tube 42 and, by it, in turn, the tube-former H, there is provided a plug 50 rigidly mounted in the platform E. From the construction of the tube-former as described, it will be noted that air spaces 48 are provided between the exterior of the inner tube 42 and the walls of the V-shaped plates 46; and communicating with these spaces 48 are tubular passages 49 in the plug member 50.

Flanking the opposite flattened surfaces of the tube-former, and in relatively close proximity thereto, near the upper end thereof, are a pair of hourglass-shaped guide-rollers 51 and 52, the surfaces of which are complemental to the flattened arcuate surfaces of the tube-former. The rollers 51 and 52 have tangential cylindrical surfaces 51a and 52a, respectively, extending beyond the hourglass-shaped portions thereof; and the roller 51 has a pair of spaced annular flanges 53 the opposed surfaces of which provide guide shoulders 54 for aligning the edges of the packaging material G and G' as said material is drawn down over the tube-former H. The rollers 51 and 52 are mounted on shafts 55 and 56, respectively, which shafts in turn are supported in cradle bearings formed in brackets 57 and 58, respectively, dependingly supported by the platform E.

Extending across the machine at opposite sides of the tube-former H, below the guide-rollers 51, 52, are a pair of channeled clamp members 59, 60, mounted to ride toward and away from each other on a pair of horizontally disposed bolts 61 rigidly carried by inverted T-shaped couplings 62, which couplings in turn are rigidly supported by bolts 63 which are adjustable in threaded openings in brackets 64 dependingly supported from the platform E, the bolts 63 being adjustable in their supports by nuts 65 to alter the position of the clamp members. Carried by the opposed faces of the clamp members 59, 60, so as to flank the tube-former H, is a pair of sealing dies 66 each having a pair of parallel flat die faces 67. These die faces on the respective dies are complemental to each other and are adapted, upon being brought together, to clamp and seal the marginal portions of the packaging material G and G' extending beyond the tube-former H. Where the character of the packaging material is such as to require heat for effecting the sealing engagement, the sealing dies 66 are provided with heating elements (not shown) mounted in suitable recesses 68 within the sealing dies, and also with a thermostat-controlled cut-off means (not shown) for preventing overheating of the dies. Electric current may be supplied to the heating elements from a terminal block 69, or in any other approved manner. The sealing dies 66 may be mounted on the clamp members 59, 60, by bolts 70 which extend freely through openings in the clamping members; and the die faces of the sealing dies may be properly aligned in parallel planes so as to provide an effective seal, by set-screws 71 threaded through face blocks 72 welded or otherwise secured to the opposed webs of the channeled clamping memebrs 59, 60. The clamping members and the sealing dies carried thereby are normally biased toward each other into clamping and sealing engagement with the marginal portions of the packaging material by tension coil-springs 73 mounted on the bolts 61 and disposed between adjustable lock-nuts 74 carried at the ends of said bolts and abutment plates 75 disposed between and fixedly secured to the walls of the channeled clamping members 59 and 60. Surrounding the bolts 61 between the plates 75 and the web of the channeled members 59, 60, are bearing sleeves 76 which may be suitably lubricated through openings 77 in the upper wall of the channeled members 59, 60.

The margin sealing dies 66 and the channeled clamping members on which they are carried, may be moved apart against the tension of the springs 73, by a longitudinally movable and rotatable collar 78, the lower portion of which is cylindrical and the upper portion of which is formed with opposite flat surfaces 78a which connect with the cylindrical portion by cam shoulders 79. The collar 78 is splined to move along a shaft 80 with the movement of the end sealing clamps J, presently to be described, and to be rotatable with said shaft 80, which also operates to control the opening and closing of said end sealing clamps J. Pivotally supported on inwardly extending arms 81, carried by the clamping members 59 and 60 in proximity to their ends, is a pair of trunnions 82 (see Figs. 7 to 11) having longitudinal grooves or rabbets 83 extending the length thereof, each trunnion having a stub-shaft 84 extending therefrom perpendicular to the axis; and mounted on the end of said stub-shaft for free rotation is a contact roller 85. The trunnions 82 are so mounted in their supports that one shoulder of the groove 83 will bear upon a hardened plate 86 of a fixed member 87 on the inverted T-shaped coupling member 62. The cooperative relationship of the parts just described is such that when the clamp members 59, 60, are in the position shown in Figs. 4 and 8, that is, when the sealing dies are in margin sealing relation to the packaging material, the rollers 85 bear against the flattened surfaces 78a on the collar 78. As the collar 78 is moved upwardly together with the upward movement of the end sealing clamps J, and the upward movement thereof approaches the end of its stroke, the cam shoulders 79 will move the rollers 85 outwardly, thus pivoting the trunnions 82 upon the bearing shoulders 86 to open the clamp members 59, 60, and the sealing dies 66. When the upward movement of said stroke has been completed and the shaft 80 is given a rotation of 90 degrees, the cylindrical portion of the collar will engage the rollers 85 to hold the sealing dies in open position, as shown in Figs. 5 and 8. It may be here stated that the upper portion of the collar 78 is of substantially flattened elliptical form in horizontal cross section, and that in the last-described position of the collar the end surfaces of the ellipse will be in contact with the rollers 85 and operate to hold the clamping members in open position until the end of the downward stroke of the end sealing clamps J, at which time the shaft 80 is again rotated through an angle of 90 degrees to bring the flat surfaces 78a of the collar into engagement with the rollers 85 and permit the margin sealing dies 66 to close under the influence of the biasing springs 61. As this cycle of operations is repeated, the opposed layers of packaging material G and G' are progressively sealed along their marginal portions to form the packaging material into a tubular member which is drawn downwardly over the tube-former.

The tube of packaging material being thus formed, is drawn down below the end of the tube-former H, the extreme lower end of the formed tube being now ready to be closed to form the bottom of the container. As soon as the container tube is closed, the package is in condition to receive its contents. The machine is so organized as to close the part of the tube which has been drawn below the tube-former, before the introduction of the contents.

The mechanism for forming the end closure of a package which may serve as its bottom may be of various forms and comprises generally the clamping mechanism J which consists of a pair of clamping members 88, 89, provided with complemental, opposed end sealing dies 90 of a length to completely span the width of the formed package and overlap the marginal seals of the formed tube. If packaging material is appropriate for heat-sealing is used, it will be understood that the sealing dies will be provided with electric heating means and thermostat controlled means, as are the margin sealing dies 66. Preferably the end sealing dies are of a width such that they operate not only as a bottom sealer, but also as a top sealer, the vertical widths of the sealing dies being of sufficient breadth to enable the filled container to be severed from the tube midway across the sealed portion, thus leaving the top of the under tube sealed and leaving a sealed bottom for the next succeeding tube above.

The operation of pulling down the tube to bring a new tube section into filling position after the section below has been filled and sealed may be accomplished by any suitable mechanism. One such mechanism is illustrated and described in detail in my prior Patent No. 1,986,422, hereinbefore referred to, and illustrated in the lower portion of Fig. 1 of this application. This mechanism includes means for opening and closing the clamping members 88, 89, and with them the end sealing dies 90, which mechanism is controlled through the partial rotation or oscillation of the shaft 80.

As described in my aforementioned patent, the herein designated clamping members 88, 89, are adjustably held upon the shafts 80 to move therewith, by means of spaced collars 91, 92, fixedly held on said shaft by set-screws or the like. The upper and lower positions of the end sealing clamps J may be adjusted either by changing the position of the collar 93 on which the bell-crank lever 94 operates, or by changing the cam bell-crank lever or the point of application of the pitman 95 to the bell-crank lever. However, when any such adjustments are resorted to for varying the distance between the end seals of a package, a corresponding adjustment must be made in the means which control the time at which the clamp members 59, 60 are made to open and close through the cooperation of the rollers 85 on the cam collars 78. As previously described, vertical adjustment of the clamping members 59, 60, may be accomplished by varying the adjustment of the bolts 63 in their supporting brackets 64. The adjustment may also be accomplished by varying the axial position of the collars 78 on the shafts 80. In this connection it will be noted (Fig. 2) that each collar 78 at its lower end screw-threadedly engages an externally screw-threaded sleeve 96 which engages an internally screw-threaded sleeve 97 fixedly carried by the collar 91. To hold the collar 78 and sleeve 97 in adjusted relation, a lock-nut 98 is provided which engages the screw-threaded sleeve 96 and is adapted to bear against the end of the sleeve 97.

The machine as thus far described will produce a connected series of packages filled with the commodity to be packaged, and all that remains to be done is to sever the formed packages from one another. The package-severing means K may be of any desired form and may operate in any desired manner, and while I have not herein shown any specific construction of package-severing means or operating mechanism for such means, it will be understood that said package-severing means K may be substantially the same as that disclosed in my aforementioned patent.

Where packages of the heat-sealed type are to be formed, it is highly desirable that such seals be completed and made secure before the sealed portions of the container are subjected to any strains or distortions which might tend to open the heat seal. Accordingly, I propose to employ means for insuring the secureness of such heat-seals prior to said sealed portions being subjected to further action, such as cross-sealing the marginal seals by the end seals or severing the sealed portions of the connected containers from one another. As herein shown, I accomplish this by directing a flow of compressed air against the heat-sealed portions. As illustrated in Figs. 2 and 2a, the marginal sealed portions of the formed tube are cooled by directing currents of air obliquely downwardly thereagainst from air-supply tubes 99 having openings 100 therein. For cooling and definitely setting the heat-sealed end closures of the packages, air-current supplying means 101 in the form of fish-tail nozzles are arranged to direct currents of air against the end seals when they are temporarily disposed one package length from the package-severing means K. The shape and location of the fish-tail nozzle air-supplying means 101 will best be gleaned from an inspection of Figs. 2, 18 and 19. Compressed air may be supplied to the tubes 99 and the nozzles 101 by pipes 102.

In the operation of the machine, the packaging material strips or ribbons G and G' are led from their respective reels 25 and 26 over suitable guides to the tube-former H, and through the guide-rollers 51, 52, whereby said ribbons are caused to embrace the tube-former H with the marginal portions of the ribbons extending beyond said former pressed between the portions 51a and 52a of the rollers 51 and 52, respectively, and with the edges of the ribbons guided by the flanges 53 on the roller 51. The opposed ribbons are thereupon formed into a tube by the successive operation of the margin-sealing dies 66. Now let it be assumed that the machine has progressed to the point where it is in full operation and that a tube of packaging material has been formed and extends below the tube-former and the end sealing clamps 59 and 60 are about to move upwardly, as shown in Fig. 12, to form the bottom seal of a package. In this upward movement as the end sealing dies approach the end of their upward stroke, the cam shoulders 79 operate to open the margin clamping members 59, 60, by moving the rollers 85 outwardly, as shown in Fig. 13. At the end of the upward stroke of the end sealing clamps (Fig. 14) the marginal sealing clamps are completely open, and it is at this point that the shaft 80 is rotated through an angle of 90 degrees (by movement of rack 103 over pinion 104 in a manner described in my aforementioned patent), which movement operates to simultaneously close the end sealing clamps and to hold open the marginal sealing clamps, as shown in Fig. 15. The end sealing clamps are now closed and proceed to move downwardly and draw with them the formed tubular packing material; the filling operation of the package also begins, the commodity to be charged into the package being supplied from the hoppers 47 of the feed mechanism F through the inner tube 42 of the tube-former H. Any suitable means may be employed for supplying a measured, weighed or counted amount of the commodity to the package, it being understood, of course, that such feed mechanism is preferably automatically operated in synchronism with the movements of the end sealing dies. Preferably the filling operation continues for a shorter period than is required to draw down the requisite length of tubular material to constitute a package. In this connection it will be noted that the upper portion of the tubular packaging material which is to form a package remains in close contact with the tube-former until after the charging of the commodity into the package has ceased. By so doing, any dust which is created during the filling operation, especially where pulverulent material is being charged into the package, is permitted to escape through the air spaces laterally of the filling tube within the tube-former and out through the openings 48 in the plug 49 and precludes the deposition of such dust upon the inner surfaces of the packaging material at the upper end of a package, which dust, if deposited on said surfaces, would interfere with the forming of a proper seal or closure especially where heat-sealing is employed. After the end sealing clamps have reached their lowermost position as shown in Fig. 16, the shaft 80 is again rotated or oscillated in a reverse direction through an angle of 90 degrees, whereupon the end sealing clamps open and the margin sealing clamps close, and the cycle of operations starting with that illustrated in Fig. 12 is repeated.

After the aforementioned cycle has been repeated three times to form the connected filled packages X, Y, and Z (Fig. 2), the first of the end seals, that is, the lower seal of package X, is brought into severing relation with the severing means K, which thereupon are caused to operate to cut away the lower portion of the first end seal, preferably through its median line; and after each successive cycle of operations, the severing means again operates to sever a connected package through the median line of an end seal into separate packages.

While I have shown and described a preferred embodiment of my automatic packaging machine, it will be understood that I do not wish to be limited to the specific details of construction disclosed, since changes may be made therein within the range of engineering skill without departing from the spirit of the invention.

What I claim is:

1. A packaging machine comprising a tube-former of substantially oblong shape in horizontal transverse cross section, means for guiding opposed layers of packaging material over and into conforming contact with the outer sides of the tube-former across the entire width thereof with the marginal portions of the packaging material extending beyond the tube-former in overlying face to face relation, and means separate from the guiding means for sealing the overlying marginal portions of said layers to form said packaging material into a tube.

2. A packaging machine according to claim 1 wherein the tube-former is substantially of flattened diamond shape in horizontal transverse cross section and has opposed symmetrically curved surfaces flanking its major diagonal.

3. A packaging machine comprising a tube-former of substantially oblong shape in horizontal transverse cross section, rollers disposed in substantially tangential relation to the opposed surfaces of the tube-former and being complementally shaped along their lines of tangency with the tube-former entirely across the width thereof for guiding opposed ribbons of packaging material over and in contact with the outer surfaces of said tube-former with the marginal portions of the packaging material extending beyond the ends of the tube-former, and means for sealing the extending marginal portions of said ribbons to form said packaging material into a tube.

4. A packaging machine according to claim 3 wherein the rollers are of greater length than the major horizontal transverse dimension of the tube-former and beyond the ends of the latter are formed with cylindrical surfaces, which on opposed rollers are tangential to each other and are adapted for pressing the marginal portions of the opposed ribbons of packaging material into contact beyond the tube-former.

5. A packaging machine according to claim 3 wherein the rollers are of greater length than the major horizontal transverse dimension of the tube-former and beyond the ends of the latter are formed with cylindrical surfaces, which on opposed rollers are tangential to each other and are adapted for pressing the marginal portions of the opposed ribbons of packaging material into contact beyond the tube-former, and shoulders on at least one of the rollers for aligning the edges of the opposed ribbons of packaging material.

6. A packaging machine according to claim 3 wherein the tube-former is of substantially flattened diamond shape in horizontal cross section, the opposed faces of which include an arcuate portion to provide smooth faces between the lateral edges of the tube-former and wherein the rollers are of substantially hour-glass shape.

7. A packaging machine according to claim 3 wherein the means for sealing the extending marginal portions of the ribbons of packaging material are separate from the guiding rollers.

8. A packaging machine comprising a tube former, means flanking said tube former for guiding opposed ribbons of packaging material over said former with the margins of said ribbons extending beyond the tube former, clamping means having heated sealing dies adapted to engage the margins of the ribbons flanking the tube former, resilient means biasing said clamping means toward each other to hold the heat-sealing dies in contact with the ribbons and means for overcoming said biasing action and to hold the clamping means with the sealing dies in spaced apart relation, said last named means comprising a longitudinally and rotatably movable collar having a cam thereon and rollers carried by the clamping means for engagement with said movable collar.

9. A packaging machine comprising a tube former, means flanking said tube former for guiding opposed ribbons of packaging material over said former with the margins of said ribbons extending beyond the tube former, clamping means having heated sealing dies adapted to engage the margins of the ribbons flanking the tube former, resilient means biasing said clamping means toward each other to hold the heat-sealing dies in contact with the ribbons and means for overcoming said biasing action and to hold the clamping means with the sealing dies in spaced apart relation, said last named means comprising a longitudinally and rotatably movable collar having opposite flattened areas providing shoulder cams at the junction of the flattened areas with the normal diameter of the collar, a pair of rollers in rolling contact with the collar, said rollers being mounted on studs extending at right angles from trunnions carried by the clamping means a fixed bearing surface, and said trunnions having means engaging said fixed bearing surface whereby to provide pivotal means for the rollers toward and away from the collar.

10. A packaging machine comprising in combination, margin sealing dies for progressively sealing the marginal portions of opposed ribbons of suitable packaging material to form a tubular structure, end sealing dies for successively closing longitudinally spaced portions of the resulting tubular structure to produce a succession of intervening individual commodity containers, means for imparting to the end sealing dies reciprocatory movements such that they may serve to draw the packaging material to form it into a tubular structure, means for alternately closing and opening the margin sealing dies and the end sealing dies, means for varying the extent of the reciprocatory movements of the end sealing dies whereby to govern the length of the package to be formed; and means for varying the timed operation of closing and opening of the margin sealing dies to respond to a change in the extent of the reciprocatory movements of the end sealing dies.

WALTER R. ZWOYER.

REFERENCES CITED

The following references are of record in the file of this patent:

UNITED STATES PATENTS

| Number | Name | Date |
|---|---|---|
| 1,986,422 | Zwoyer | Jan. 1, 1935 |
| 2,145,941 | Maxfield | Feb. 7, 1939 |
| 2,160,367 | Maxfield | May 30, 1939 |
| 2,200,971 | Sonneborn et al. | May 14, 1940 |
| 2,257,823 | Stokes | Oct. 7, 1941 |
| 2,083,969 | Walter | June 15, 1937 |
| 2,246,043 | Heinmets | June 17, 1941 |
| 706,895 | Britton et al. | Aug. 12, 1902 |
| 2,006,375 | Vogt | July 2, 1935 |
| 2,037,903 | Hilburt | Apr. 21, 1936 |
| 2,156,466 | Vogt | May 12, 1939 |
| 2,166,643 | Salfisberg | July 18, 1939 |